2,707,842

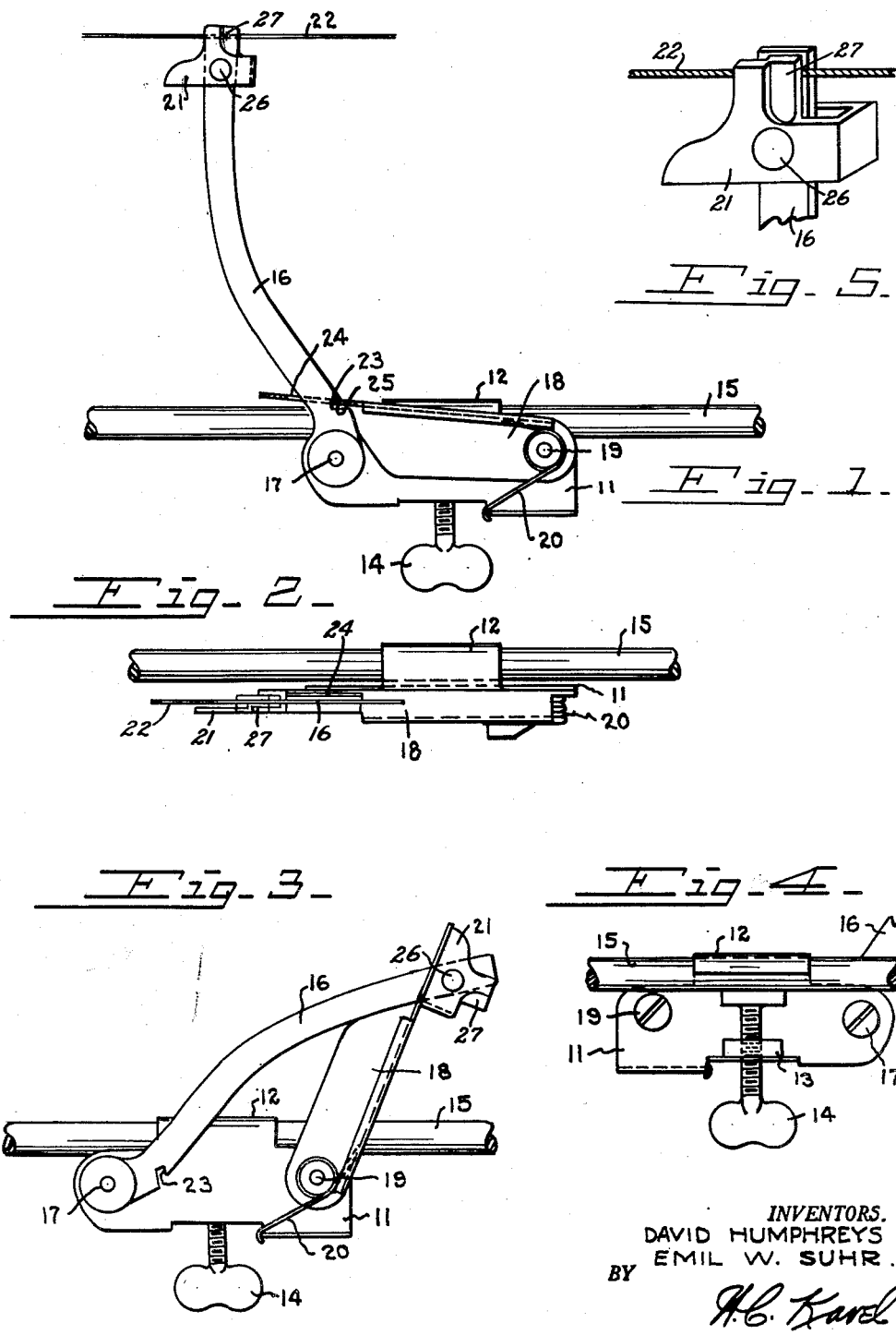

AUTOMATIC FISHING DEVICES

David Humphreys and Emil W. Suhr, Cincinnati, Ohio

Application May 28, 1952, Serial No. 290,486

1 Claim. (Cl. 43—15)

Our improved automatic fishing device is adapted to be attached to a fishing rod and arranged to engage the line after the line has been cast into the water. The trigger is set and the line engaged with the device. When a fish attempts to take the bait, the trigger is tripped by the pull on the line and the line is sharply drawn back for setting the hook and at the same time the line is released from the device for free movement of the line to permit playing the fish or reeling him in.

The object of our invention is to provide an automatic fishing device which can be engaged with the line and set to jerk the line when the hook end of the line is pulled.

A further object is to provide means for engaging the line and means to release the engaging means after the line has been jerked.

Further objects reside in the novel arrangement of parts.

Our invention will be further readily understood from the following description and claims, and from the drawings, in which latter:

Fig. 1 is a side view of our improved device shown in cocked position.

Fig. 2 is a plan view of the same.

Fig. 3 is a side view similar to Fig. 1, with the parts in released position.

Fig. 4 is a fragmentary rear side view, showing the means for clamping the device to a fishing rod.

Fig. 5 is an enlarged detail perspective view of the line clamping mechanism.

Our improved device comprises a supporting member 11 having a rod engaging lip 12 and a base portion 13 through which a clamping screw 14 is threaded to lock the device to a fishing rod 15.

An arm 16 is pivoted to the supporting member 11 as at 17 and cooperates with an arm 18 pivoted at 19 to the supporting member 11. A coil spring 20 about the pivot 19 normally urges the arm 18 to the position shown in Fig. 3.

The upper end of the arm 16 has a member 21 pivoted thereto as at 26, having an offset 27 to provide a cam action with the arm for pinching a fishing line 22 between the member 21 and the arm when the member is moved forward on its pivot.

The arm 16 has a notch 23 and the arm rides in a slot 24 on the arm 18. The notch 23 is engaged with the rear edge 25 of the slot for holding the device in cocked position when the arm 18 is brought forward. The slot 24 in the arm 18 when the notch is released from the end of the slot carries the arm 16 rearwardly and the arm 18 engages the member 21 when in fully retracted position rotating the member 21 on its pivot to disengage the line 22 from between the arm 16 and the member 21, by moving the member 21 upwardly to open the cam action between the member and the arm.

The device is attached to a fishing rod with the arm 16 extending toward the tip end of the rod. After the line is cast, the arms are arranged in cocked position as shown in Fig. 1 and the line is engaged between the end of the arm 16 and the member 21. When a fish takes the bait, the arm 16 is moved forward by the pull on the line releasing the notch 23 from the end of the slot. The arm member 18 rapidly pulls the arm 16 backward to set the hook in the fish and at the final movement of the arms the arm 18 strikes the member 21 to disengage the line for free movement of the line in respect to the fishing rod, whereby the fish can be played or reeled in.

Having thus fully described our invention, what we claim as new and desire to secure by Letters Patent, is:

In an automatic fishing device, a supporting member, a clamp on said member for attaching said device to a fishing rod, a pair of arms each having ends pivoted respectively to opposite ends of said member, one of said arms provided with a slot, the other arm extending through said slot and provided with a notched portion engageable with a wall of said slot for holding said arms in cocked position, means for retracting said arms upon release of said notched portion with the wall of said slot, means for clamping a fishing line to said notched arm, said means comprising a pivoted member on said notched arm, said pivoted member being engageable with and pivoted by said slotted arm upon retraction thereof, pivotal movement of said member functioning to release said clamping means to free the line.

References Cited in the file of this patent

UNITED STATES PATENTS

| | | |
|---|---|---|
| 677,655 | Gray | July 2, 1901 |
| 975,822 | Becker et al. | Nov. 15, 1910 |
| 1,317,843 | Wehner et al. | Oct. 7, 1919 |
| 2,295,250 | Zenewich | Sept. 8, 1942 |
| 2,374,752 | Johnson | May 1, 1945 |
| 2,657,492 | Skorr | Nov. 3, 1953 |

FOREIGN PATENTS

| | | |
|---|---|---|
| 96,550 | Sweden | Aug. 15, 1939 |
| 287,367 | Great Britain | Mar. 22, 1928 |